United States Patent
Liu et al.

(10) Patent No.: US 8,473,602 B2
(45) Date of Patent: Jun. 25, 2013

(54) SYSTEM AND METHOD FOR AUTONOMIC SYSTEM MANAGEMENT THROUGH MODULATION OF NETWORK CONTROLS

(75) Inventors: Zhen Liu, Tarrytown, NY (US); Dimitrios Pendarakis, Westport, CT (US); Jeremy I. Silber, New York, NY (US); Laura Wynter, Chappaqua, NY (US)

(73) Assignee: Intellectual Business Machines Corporation, Armonk, NY (US)

( * ) Notice: Subject to any disclaimer, the term of this patent is extended or adjusted under 35 U.S.C. 154(b) by 774 days.

(21) Appl. No.: 11/150,351

(22) Filed: Jun. 11, 2005

(65) Prior Publication Data

US 2006/0280161 A1 Dec. 14, 2006

(51) Int. Cl.
*G06F 15/173* (2006.01)

(52) U.S. Cl.
USPC ........................................................ 709/224

(58) Field of Classification Search
USPC .......... 709/224, 234, 223, 233, 229; 455/450, 455/13.1, 427; 370/389, 351, 232, 236, 400, 370/235, 395.21, 229, 392, 252; 706/14; 710/200
See application file for complete search history.

(56) References Cited

U.S. PATENT DOCUMENTS

| | | | |
|---|---|---|---|
| 5,949,758 A * | 9/1999 | Kober | 370/232 |
| 6,359,901 B1 * | 3/2002 | Todd et al. | 370/465 |
| 6,574,195 B2 | 6/2003 | Roberts | |
| 6,768,716 B1 | 7/2004 | Abel et al. | |
| 6,813,635 B1 | 11/2004 | Jorgenson | |
| 6,816,907 B1 | 11/2004 | Mei et al. | |
| 6,823,382 B2 | 11/2004 | Stone | |
| 7,062,559 B2 * | 6/2006 | Yoshimura et al. | 709/226 |
| 7,453,804 B1 * | 11/2008 | Feroz et al. | 370/230 |
| 7,454,458 B2 * | 11/2008 | Islam et al. | 709/203 |
| 7,499,968 B1 * | 3/2009 | Alexander et al. | 709/203 |
| 2002/0082856 A1 * | 6/2002 | Gray et al. | 705/1 |
| 2003/0033425 A1 * | 2/2003 | Deshpande | 709/233 |
| 2003/0233220 A1 * | 12/2003 | Ignatowski et al. | 703/22 |
| 2005/0018611 A1 * | 1/2005 | Chan et al. | 370/241 |
| 2005/0086645 A1 | 4/2005 | Diao et al. | |
| 2005/0195748 A1 * | 9/2005 | Sanchez | 370/252 |
| 2005/0207439 A1 | 9/2005 | Iyengar et al. | |
| 2005/0268063 A1 | 12/2005 | Diao et al. | |

(Continued)

OTHER PUBLICATIONS

U.S. Appl. No. 11/327,069, filed Jan. 6, 2006., Pendarakis et al.

(Continued)

*Primary Examiner* — Asad Nawaz
*Assistant Examiner* — Saad A Waqas
(74) *Attorney, Agent, or Firm* — August Law, LLC; George Willinghan (57) ABSTRACT

Systems and methods are provided to determine an allocation of network resources in a distributed on-demand information technology (IT) systems using existing control mechanisms for other operating system resources in order to achieve a desired operating point within the IT system. This desired operating point is obtained by optimizing a goal-based objective function while taking into account system constraints. The relationship between utilization of all system resources, i.e. network resources and processing resources, and attainment of performance objectives is autonomously obtained for a plurality of actions that could be required by a range of system applications. This relationship is used to allocate network resources to applications while maintaining desired performance objectives. The allocation is enforced using existing control mechanisms.

16 Claims, 3 Drawing Sheets

U.S. PATENT DOCUMENTS

2006/0155398 A1* 7/2006 Hoffberg et al. .......... 700/86
2006/0235691 A1* 10/2006 Tomasic et al. .......... 704/257
2006/0251116 A1* 11/2006 Bedingfield et al. .......... 370/468

OTHER PUBLICATIONS

Georgiadis et al., "Efficient network QoS provisioning based on per node traffic shaping", IEEE Infocom (1996).

Yates et al. "On per-session end-to-end delay distributions and the call admission problem for real-time applications with QOS requirements", (1993).

Knightly and Zhang, "D-BIND: an accurate traffic model for providing QoS guarantees to VBR traffic" (1997).

R. Cruz, "A Calculus for Network Delay" IEEE Transactions on Information Theory, vol. 37, No. 1 (Jan. 1991).

M. H. Shor, K. Li, J. Walpole, D.C. Steere, C. Pu, "Application of Control Theory to Modeling and Analysis of Computer Systems" (2000).

D. Rosu et al. "FARA: Adaptive res. alloc. In complex real-time systems", (1998).

Rejaie et al. "RAP: and end-to-end rate-based congestion control mechanism for real-time streams in the Internet", (1997).

Abeni and Buttazzo "Adaptive bandwidth reservation for multimedia computing" IEEE Conference on Real-Time Computing Systems and Applications, Hong Kong (Dec. 1999).

Liang, Nahrstedt and Zhou "Adaptive Multi-Resource Prediction in Distributed Resource Sharing Environment" (2004).

Adve, Kravets, Hahrstedt, et. al. "The Illinois GRACE Project: Global Resource Adaptation through CoopEration" SHAMAN (Jun. 2002).

* cited by examiner

SYSTEM AND METHOD FOR AUTONOMIC SYSTEM MANAGEMENT THROUGH MODULATION OF NETWORK CONTROLS

STATEMENT REGARDING FEDERALLY SPONSORED RESEARCH

The invention disclosed herein was made with U.S. Government support under Contract No. H98230-04-3-0001 awarded by the U.S. Department of Defense. The Government has certain rights in this invention.

FIELD OF THE INVENTION

The present invention is directed to resource management in large-scale information technology systems.

BACKGROUND OF THE INVENTION

Resource management in large-scale IT systems presents a number of challenges. Current service models such as grid and utility computing increase the complexity of resource management by creating highly bursty and unpredictable resource demand patterns. These demand patterns are very difficult to anticipate or to characterize in advance. Successful operation of these service models requires meeting service level agreements (SLA's) on application performance. Conventional resource management approaches allocate system resources by estimating the statistical expectations of application resource demands and attempting to compute a theoretical bound on the probability of an SLA violation.

By contrast, a dynamic resource manager monitors the performance of the IT system and the utilization of system resources, adjusting the allocation of resources when system operation is deemed to be off-target, or not meeting the prescribed SLA's. In general, a resource manager acts upon the available controls that are used to apply scheduling methods to regulate and order the use of resources by the various applications. For example, a process scheduling function is used to allocate shares of the processing resource, i.e. the one or more central processing units (CPUs), among the various processes being executed by that processing resource. A dynamic resource manager proposes changes to these allocations upon a determination that certain performance objectives are not being fulfilled, and/or when it calculates an alternate allocation that may be advantageous.

Dynamic resource managers control various types of system resources, for example processing resources (e.g. CPU cycles), main system memory, disk space and network resources (e.g. communication bandwidth and network buffers). Conventional approaches manage processing resources and networking resources independently, generally ignoring the complex dependency between availability and utilization of each resource. In fact, prevailing approaches to performance-based resource management in IT systems control processing resources, while assuming that network capacity is over-provisioned. This assumption only holds true in systems where the deployed applications are very computationally intensive, have very limited communication requirements, and do not involve long-distance or low-bandwidth communication links.

However, as IT systems expand in size and geographic scale, make increased use of public and wide area networks, and cope with unpredictable demands introduced by new application models such as grid computing, utility computing and multimedia stream processing, network resource management becomes an integral part of system management. The transfer of large amounts of data over communication resources that are not over-provisioned, coupled with a degree of unpredictability adds substantial complexity to the overall system management.

Therefore, systems and methods are needed that control network resource allocation to achieve application performance objectives as well as to achieve target utilization of other system resources such as computing resources. These systems and methods need to explicitly take into account the complex dependency between availability and utilization of each one of the types of resources in the system, including processing resources and network resources.

SUMMARY OF THE INVENTION

The disclosed invention is a control mechanism for information technology (IT) systems. Such systems may include (but are not limited to) distributed computing systems, grid computing and stream processing systems. The invention modulates the amount of networking resources allocated to different tasks and/or applications in conjunction with (more conventional modulation of) other system resources, e.g. processing power (CPU), queueing order determination, disk allocation and main memory allocation, to drive an IT system to a desired operating point. This desired operating point is obtained by optimizing a goal-based objective function while taking into account system constraints. When network resources are oversubscribed, resulting in bottlenecks, the described control mechanisms incorporate network resource management into existing processing resource management, thus facilitating proper functioning of the IT system.

The present invention utilizes network resources as a set of control variables to manage an IT system. This use of network resources relies on the understanding of the relation between network resource utilization and attainment of performance objectives for applications running on (one or more nodes of) the IT system. This relationship and the mechanisms for using this relationship to enforce the desired performance objectives are autonomously determined by the invention. Existing control mechanisms that do not explicitly control the allocation of network resources may be used in conjunction with our invention to achieve performance objectives. Utilization of existing control measures and techniques provides for the addition of new control parameters without precluding or reducing the functionality of existing mechanisms. Therefore exemplary systems and methods in accordance with the present invention work in conjunction with existing control mechanisms to control resource usage and provide workload execution in compliance with the desired performance objectives.

DETAILED DESCRIPTION

Figure 1:
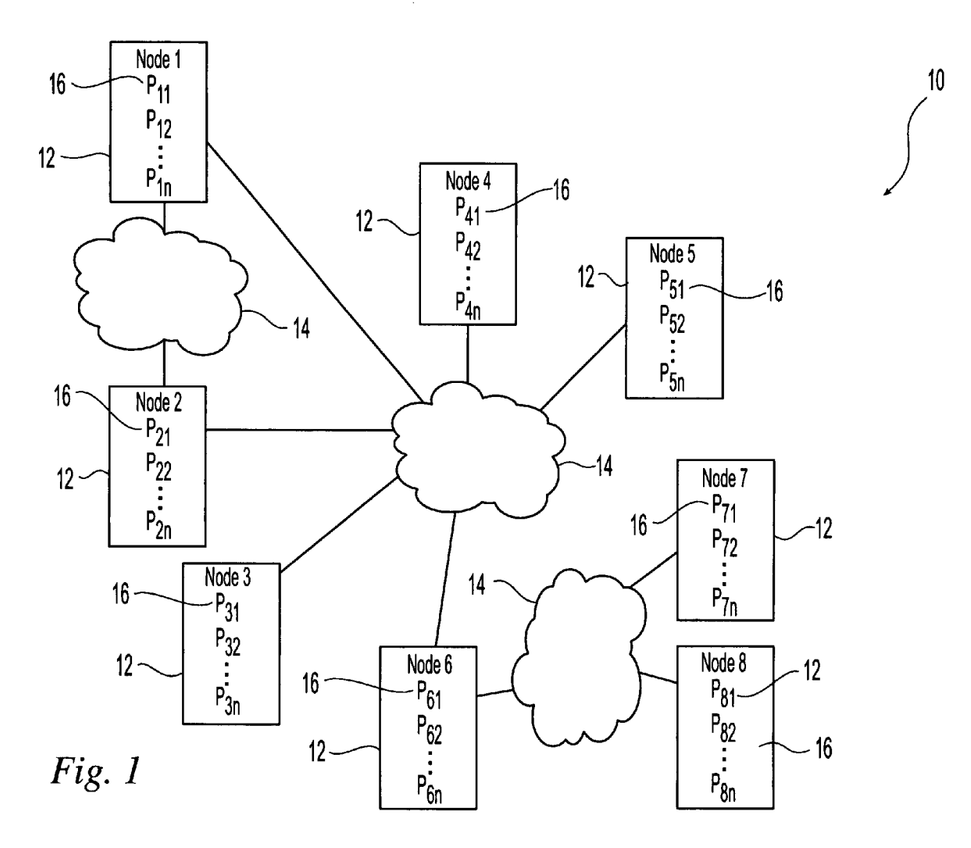
FIG. 1 is a schematic representation of an embodiment of a distributed information technology system for use in accordance with the present invention.

Exemplary systems and methods in accordance with the present invention provide a simple and efficient control mechanism for use in enforcing performance objectives in computing systems such as information technology (IT) systems. Referring to FIG. 1, an example of an IT system 10 for use with exemplary embodiments of the present invention is illustrated. The IT system 10 includes a plurality of distributed nodes 12 or computers that are in communication with each other across one or more networks 14. These networks 14 include local area networks and wide area networks such as the Internet. Each node contains at least one logical processor, for example a central processing unit (CPU) that is capable of executing one or more of a plurality of applications or programs 16 that are run on that node or computer. These applications or programs 16 provide the various functionalities of the IT system 10. The nodes or computers send and receive data flows through the network for the applications running on those computers. Each node can also contain one or more storage mediums to store the executable code for performing the applications 16 and to store other data.

Each node 12 contains a plurality of processing resources, i.e. CPU and main memory that are used for the execution of the applications 16 at that node. These processing resources may or may not be managed by an existing resource manager. In addition to processing resources, the IT system 10 includes network resources, e.g. communication network bandwidth and network buffer space, that are utilized in the movement of data, i.e. data flows, among the various nodes 12 of the system 10. The utilization and availability of both processing resources and network resources affect the performance of the IT system. Exemplary methods in accordance with the present invention are applied on a node-by-node basis to control the utilization and allocation of both processing resources and network resources at each node.

Methods in accordance with the present invention optimize the performance of applications running on nodes of the IT system according to set performance objectives. Therefore, by optimizing the performance objectives, the performance of the IT system itself is optimized. Distributed applications send to and receive data among different nodes, hence consuming both processing and network resources. Utilization of both of these types of resources is interdependent. Utilization of processing resources and application performance are affected by the availability and utilization of network resources. For example, if a given application is at point where it needs to send large amounts of data across the network and the currently available network bandwidth is low, then the application performance decreases. Therefore, interdependency exists between the utilization of processing resources and the utilization of network resources. This interdependence also affects the realization of the performance objectives for the IT system. Therefore, optimization of application performance involves optimization of the use of processing and network resources by the application. Hence, the utilization of both processing resources and the utilization of network resources are controlled to achieve the desired performance objectives for the execution of each application on the node, the resource utilization by that node and the overall operation of the IT system. Methods in accordance with the present invention determine this interdependence or relationship between utilization of processing resources and utilization of network resources and use it to calculate the processing and network resource allocations that optimize the performance objectives. The methods used to determine the relationship account for the unpredictable, "bursty" and dynamic nature of network resource utilization by the applications.

Figure 2:
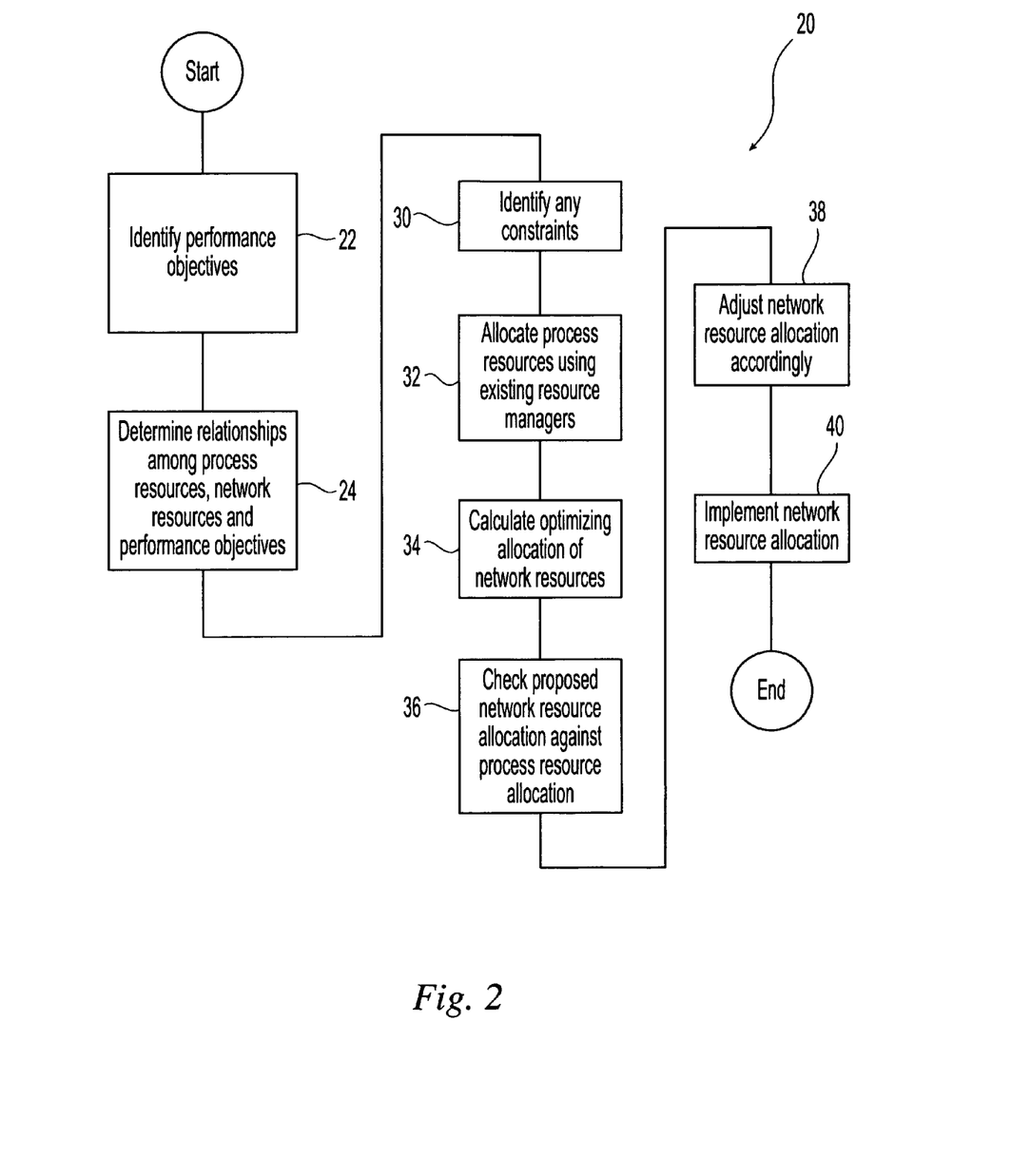
FIG. 2 is a flow chart illustrating an embodiment of a method for network resource allocation in accordance with the present invention.

Referring to FIG. 2, an exemplary embodiment of a method for resource management in an IT system 20 is illustrated. Although illustrated as a single pass process, it is understood that the exemplary method can be operated as a continual or repetitive loop or process. Therefore, after any given implementation, a subsequent set of performance objections and relationships are identified. Initially, for at least one application running on a given computer in a computing system containing a plurality of computers at least one performance objective is identified that can be affected by the utilization of processing resources and network resources during the execution of the application 22. Each computer in the computing system is running a plurality of applications. Therefore, in one embodiment, a performance objective is identified for each one of the plurality of applications running on a given computer. Alternatively, a plurality of performance objectives is identified for a single application running on the computer or for a plurality of applications running on the computer. This process may also involve the identification of the processing resources and networking resources that affect the performance objective. The application specific identification of processing and network resources and performance objectives may be repeated for a plurality of nodes in the IT system. The plurality of nodes can be the entire set of computers in the computing system or a subset of these computers.

The processing resources are resources within the computer or node that are utilized by any applications running on that computer and include, but are not limited to CPU, main memory and disk space. The network resources are utilized by each application when exchanging messages, calls or data across the network between nodes and include, but are not limited to communication bandwidth, communication buffer space, link bandwidth, network switching bandwidth, network interface buffer capacity, operating system buffer capacity, application buffer capacity, network switching buffer capacity and combinations thereof. Performance objectives can be expressed in terms of the allocation of either network resources, processing resources or both network and processing resources. Alternatively, the performance objectives are expressed in terms of an application performance objective that is not directly linked to utilization of a specified resource, either a network resource or a processing resource. In one embodiment, the performance objective expresses a desired allocation of CPU processing power among several applications running simultaneously on the node or computer. For example, the performance objective states that 50% of the processing power is allocated to a first application, 20% to a second application and 25% to a third application. In another embodiment, the performance objective is not expressed in terms of the allocation of a particular processing resource but is a statement of a desired application performance objective. For applications that send messages or calls across the network and receive replies to these messages, application performance may be characterized by the time, i.e. roundtrip time, taken for each pair of incoming and outgoing messages. Therefore, in another embodiment, the performance objective might state that the maximum desired roundtrip time for a first application is 30 milliseconds, 5 milliseconds for a second application and 2 milliseconds for a third application.

Having identified one or more performance objectives, at least one relationship between the utilization of processing resources or network resources and the realization of performance objectives is determined 24. Alternatively, a plurality of relationships is determined. The relationships are determined without requiring prior knowledge and without human intervention or calibration, i.e. autonomously. In one embodiment, relationships are determined on an application basis;

i.e., the relationship between network resource utilization or processing resource utilization and performance objective realization is determined for each one of a plurality of applications. Alternatively, a more complex relationship is determined involving the simultaneous relationship among the network resources, processing resources and performance objectives for a plurality of applications. While prior knowledge and human intervention and calibration are not required, some or all may be incorporated into the method if available.

In one embodiment, relationships are determined using methods suitable to account for the dynamic nature of resource usage in an IT system. In one embodiment, the relationships are determined using learning algorithms. Preferably, these learning algorithms are applied in real time during operation of the IT system with minimal perturbations to the system. In one embodiment, the learning algorithms are applied continuously so that the relationships can be updated over time, which accounts for the dynamic and changing nature of resource utilization in the computer system. Any learning based algorithm that is capable of collecting measurements of network or processing resource utilization and performance over time and of deriving functions that describe the relationships between the utilization of processing or network resources and the realization of performance objectives can be used. In one embodiment, the learning-based algorithm is a dynamic, stochastic control algorithm. An example of a dynamic, stochastic control algorithm is found in U.S. patent application Ser. No. 11/327,069 filed Jan. 6, 2006 and corresponding to IBM docket Number YOR920050065US1, which is incorporated herein by reference in its entirety.

In general, the relationship between processing resource utilization or network resource utilization and performance objective realization for a given application is determined by recording observations of the utilization levels for different resources and realization levels for various performance objectives at periodic intervals of time during the execution of a given application on a given node within the IT system. For each observation an n-tuple of parameters is recorded, including allocation and utilization of networking resources as well as utilization of processing resources for each application under control. The measurements represent sample points in the multi-dimensional space of resource utilization for different applications and are collected during regular system operation, i.e. no perturbation to the regular system operation is required. This collection of measurements facilitates an approximation of the multi-dimensional function expressing the dependency between processing resource utilization, performance objective realization and network resource utilization. Appropriate filtering techniques can be used to reduce the impact of random fluctuations and measurement errors on the observed measurements. Suitable filtering techniques are known and available in the art.

The determined relationships are used to identify a desired set of actions in the joint space of all controllable resources, including all of the available network resources and the processing resources. These sets of actions are chosen to optimize the execution of applications running on computers or nodes within the IT system by optimizing the identified performance objectives. Therefore in one embodiment, the determined relationships are used to control the allocation of network resources utilized by a given application to optimize one or more performance objectives. In general, the performance objective is a prescribed performance target for the execution of the application and the utilization of resources. In one embodiment, the performance objective is expressed as a function of the allocation of CPU processing power to a single application or among several applications running simultaneously on a given computer. For example, the performance objective states that 50% of the processing power is allocated to a first application, 20% to a second application and 25% to a third application.

In another embodiment, the performance objective is not expressed directly in terms of the allocation of a particular processing resource but is a statement of a desired quality metric for a performance parameter of the application. For applications that send messages or calls across the network and receive replies to these messages, application performance is affected by the delay, i.e. roundtrip time, taken for each pair of incoming and outgoing messages. Therefore, the performance objective states that the maximum desired roundtrip time for a first application is 30 milliseconds, 5 milliseconds for a second application and 2 milliseconds for a third application. The allocation of the processing resources is controlled based upon this desired goal.

In one embodiment, additional constraints on either the allocation of processing resources or the realization of performance objectives are identified 30. Suitable constraints on processing resource allocation include, for example, that each application is allocated at least 2% of the total CPU processing power at any given time or that each application has access to at least 1 MB of memory. Suitable constraints on performance objectives include that each application should experience round-trip delay times of no more than 35 milliseconds. Similar constraints can also be defined for the allocation of network resources.

Having determined the desired performance objective, the allocation of network resources or processing resources to be used for the execution of the application is calculated 34 such that each identified performance objective is optimized. The determined relationships between processing resource allocation or network resource allocation and performance objectives are used to calculate the proposed optimizing network resource or processing resource allocation. For each application running on a given node, the proposed allocation of network resources represents the amount of networking resources, e.g. bandwidth, allocated to that application during a current time interval. As the determined relationships can change over time, these relationships are update as are the calculated allocations. In one embodiment, the determined relationships and calculated allocations are updated at regular intervals. Preferably, the determined relationships and calculated allocations are updated continuously in real time.

In one embodiment, utilization of processing resources by an application can be viewed as exhibiting monotonic behavior as a function of the amount of networking resources allocated to that application. Utilization of processing resources by a given application running at a given node as a function of the amount of networking resources allocated to that application can be expressed, for example, by a function C(B). This function, C(B), is either increasing or decreasing. For example, an application that processes an incoming data stream consumes CPU resources to process the data. The greater the amount of data received, the greater the amount of CPU resources consumed and the amount of data transmitted or received across the network. Hence, the function C(B) is increasing, i.e., increasing network resource usage means increasing processing resource usage. In another example, a smaller volume of incoming or outgoing data traffic results in an increase in processing resource requirements. For example, a multimedia application requires more CPU power to perform higher levels of compression of an outgoing multimedia stream and, similarly, more CPU power to expand the highly compressed incoming stream. However, this higher level of compression results in a decrease in the size or volume of data traveling across the network. For such applications, the function C(B) is decreasing, i.e., an increase in processing resource usage translates into a decrease in network resource usage. Exemplary embodiments in accordance with the present invention maintain knowledge of this relationship between processing resource utilization and network resource utilization and use the relationship in calculating the optimizing allocation of network resources to determine, depending on the current application performance and processing resource utilization, whether the amount of networking resources allocated is to be increased or decreased.

The calculated allocation of network resources can be viewed as a proposed or desired set of actions to be taken with respect to network resource allocation, for example either increasing or decreasing the network allocation provided to one or more applications. Examples of these actions include increasing bandwidth to a first application running on a given node by 10% and decreasing the bandwidth to a second application running on that node by 5%. In one embodiment, these sets of actions are determined jointly for all applications on a given computer or node, preferably in accordance with a prescribed periodic time interval.

The calculated allocation of network resources, i.e. the actions, may have an effect on the allocation of processing resources or on the realization of the performance objectives. These effects could represent a potential violation of a prescribed constraint or an undesired decrease in performance. Therefore, in one embodiment, the proposed calculated network resource allocations are analyzed against the current processing resource allocation 36 to establish any potential effects of the proposed network resource allocation on the processing resource allocation or performance objective. In one embodiment, existing processing resource controllers in the IT system are used to control the processing resources, for example CPU utilization, disk space and memory allocation, and therefore these existing controllers or models thereof are used to establish and weigh the costs and benefits of potential reactions by existing controllers to the control action in consideration.

Based upon any effects that the proposed network resource allocation causes in the processing resource allocation or performance objective realization, the allocation of network resources may be adjusted or scaled as necessary to achieve the desired or selected performance objective 38.

The calculated network resource allocations, including any scaling or adjustments are then implemented 40. Any suitable mechanism can be used to effectuate or implement the desired action in the computer system. Examples of these mechanisms include, but are not limited to network filters and network resource reservation mechanisms and protocols, such as integrated services and differentiated services.

The steps of identifying the performance objectives, expressing performance objectives as resource allocations, identifying actions defining the allocating of network and processing resources, checking the proposed network allocations using existing resource controllers and adjusting network processing resource allocations can be run in series or can be carried out in parallel. In addition, methods for network resource allocation in accordance with the present invention can be run as a single allocation. Alternatively, the process steps can be run as a continuous loop so that the determination of relationships among processing resource allocation, network resource allocation and performance objectives, the selection of performance objectives, the allocation of processing resources and the allocation of network resources are updated over time to account for the dynamic nature of the IT system.

Figure 3:
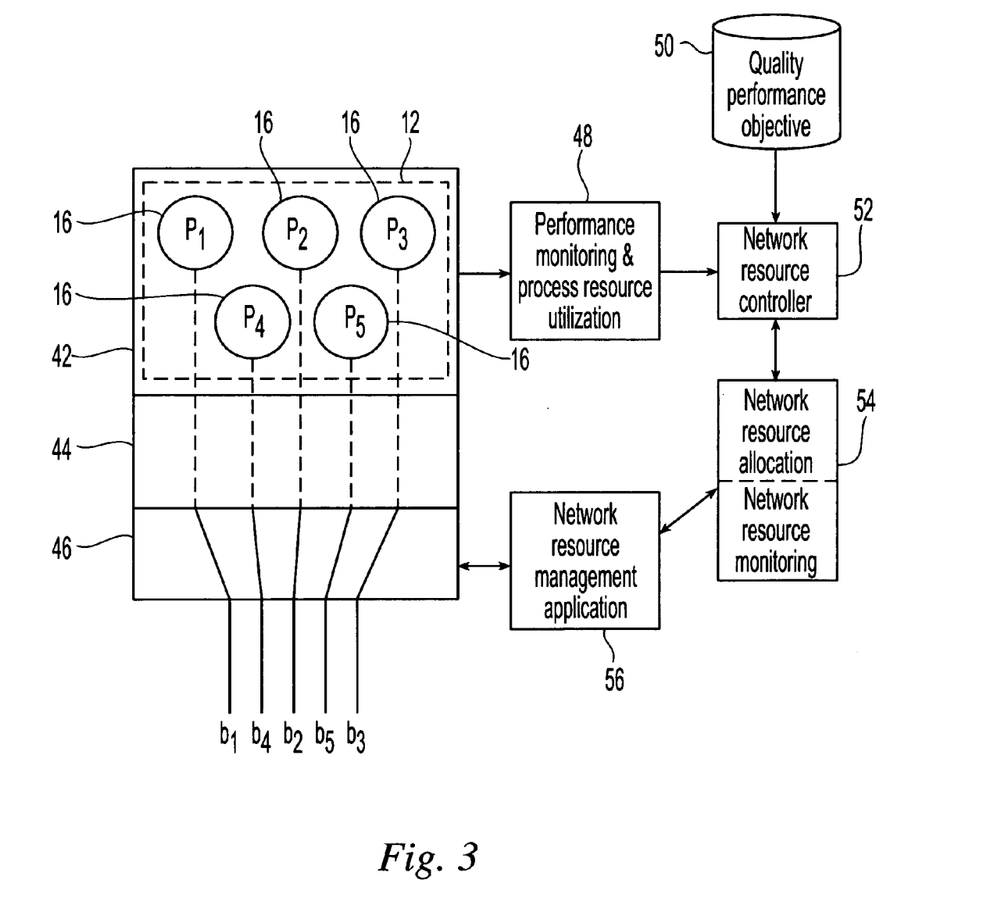
FIG. 3 is a block diagram illustrating an embodiment of a system for conducting methods in accordance with the present invention on a single node.

Referring to FIG. 3, a realization of an exemplary embodiment of a method in accordance with the present invention applied to single system node within the IT system is illustrated. As illustrated, a plurality of applications 16 is running in a single node 12 at the application layer 42 of the network. Each application communicates through the transport layer 44 and network layer 46 to utilize network resources within the IT system. A network resource controller 52 uses a performance monitoring and processing resource utilization interface 48 to collect the appropriate resource utilization and performance measurements to be used with methods in accordance with the present invention. In addition, a network resource interface 54 is provided to monitor the allocation of network resources and to modify the allocation of network resources in accordance with the present invention. The network resource interface uses a network resource management application 56 to monitor and to control the network resources in the network layer. The desired performance objectives 50 are provided as an input to the network resource controller 52 using any suitable input device or by reading the objectives from a database. Exemplary methods in accordance with the present invention can operate in any IT system that provides for the monitoring of processing resource utilization and network resource utilization on a per application (process) basis.

The present invention is also directed to a machine-readable or computer-readable medium containing a machine-executable or computer-executable code that when read by a machine or computer causes the machine or computer to perform a method for processing and network resource management in a computing system in accordance with exemplary embodiments of the present invention and to the computer-executable code itself. The machine-readable or computer-readable code can be any type of code or language capable of being read and executed by the machine or computer and can be expressed in any suitable language or syntax known and available in the art including machine languages, assembler languages, higher level languages, object oriented languages and scripting languages. The computer-executable code can be stored on any suitable storage medium or database, including databases disposed within, in communication with and accessible by computer networks utilized by systems in accordance with the present invention and can be executed on any suitable hardware platform as are known and available in the art.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s). Therefore, it will be understood that the appended claims are intended to cover all such modifications and embodiments, which would come within the spirit and scope of the present invention.

What is claimed is:

1. A method for processor and network resource management in a computing system, the method comprising:
identifying a plurality of performance objectives for a plurality of applications that utilize network and processing resources and are running on a given computer in a computing system containing a plurality of computers each running a plurality of applications, each identified performance objective dependent upon utilization of the network and processing resources by the application and comprising a prescribed performance target for execution of the application and a prescribed allocation of central processing unit processing power among the plurality of applications running on the given computer;

recording observations of utilization levels of the network and processing resources and associated realization levels for each performance objective over time during the execution of the applications, each observation comprising a sample point in a multi-dimensional space that comprises a separate dimension for each controllable processing resource and the utilization of that controllable processing resource, each allocatable network resource and the utilization of that allocatable network resource and each performance objective and the realization levels of that performance objective such that the utilization of controllable processing resources central processing unit power, disk space and main memory contained in the given computer and utilized by the applications and allocatable network resources communication bandwidth, communication buffer space, link bandwidth, network switching bandwidth, network interface buffer capacity, operating system buffer capacity, application buffer capacity, network switching buffer capacity and queueing order within the computing system and utilized by the plurality of applications and each one of the plurality of performance objectives and the realization of that performance objective are covered;

using the recorded observations to determine a multi-dimensional function expressing a dependency within the multi-dimensional space between realization of the identified performance objectives and utilization of the network and processing resources by the applications;

using the determined multi-dimensional function to identify a desired set of actions with regard to allocation of the network and processing resources to the applications that optimizes the identified performance objectives, the desired set of actions comprising increasing and decreasing the allocation of the network and processing resources among the applications;

maintaining functions expressing utilization of processing resources by each application as a function of network resource allocation to that application;

using the maintained functions to analyze network resource allocations proposed by the identified desired set of actions for potential effects on processing resource allocations and performance objectives;

scaling the proposed network resource allocations based upon the potential effects; and implementing the desired set of actions with regard to the allocation of the network and processing resources and the scaling of the proposed network resource allocations.

2. The method of claim 1, wherein the step of using the recorded observations to determine the function further comprises using learning algorithms to determine the function.

3. The method of claim 1, wherein the step of using the recorded observations to determine the function further comprises using a stochastic control algorithm to determine the function.

4. The method of claim 1, further comprising updating the determined function and the calculated allocation of the network and processing resources continuously in real time.

5. The method of claim 1, wherein the plurality of computers communicate across a network.

6. The method of claim 1, further comprising identifying at least one constraint on the allocation of network resources.

7. The method of claim 1, wherein the step of implementing the allocation of network and processing resources comprises using network filters or network resource reservation mechanisms to implement the allocation of network resources.

8. A non-transitory computer readable storage medium containing a computer executable code that when read by a computer causes the computer to perform a method for processor and network resource management in a computing system, the method comprising:

identifying a plurality of performance objectives for a plurality of applications that utilize network and processing resources and are running on a given computer in a computing system containing a plurality of computers each running a plurality of applications, each identified performance objective dependent upon utilization of the network and processing resources by the application and comprising a prescribed performance target for execution of the application and a prescribed allocation of central processing unit processing power among the plurality of applications running on the given computer;

recording observations of utilization levels of the network and processing resources and associated realization levels for each performance objective over time during the execution of the applications, each observation comprising a sample point in a multi-dimensional space that comprises a separate dimension for each controllable processing resource and the utilization of that controllable processing resource, each allocatable network resource and the utilization of that allocatable network resource and each performance objective and the realization levels of that performance objective such that the utilization of controllable processing resources central processing unit power, disk space and main memory contained in the given computer and utilized by the applications and allocatable network resources communication bandwidth, communication buffer space, link bandwidth, network switching bandwidth, network interface buffer capacity, operating system buffer capacity, application buffer capacity, network switching buffer capacity and queueing order within the computing system and utilized by the plurality of applications and each one of the plurality of performance objectives and the realization of that performance objective are covered;

using the recorded observations to determine a multi-dimensional function expressing a dependency within the multi-dimensional space between realization of the identified performance objectives and utilization of the network and processing resources by the applications;

using the determined multi-dimensional function to identify a desired set of actions with regard to allocation of the network and processing resources to the applications that optimizes the identified performance objectives, the desired set of actions comprising increasing and decreasing the allocation of the network and processing resources among the applications;

maintaining functions expressing utilization of processing resources by each application as a function of network resource allocation to that application;

using the maintained functions to analyze network resource allocations proposed by the identified desired set of actions for potential effects on processing resource allocations and performance objectives;

scaling the proposed network resource allocations based upon the potential effects; and implementing the desired set of actions with regard to the allocation of the network and processing resources and the scaling of the proposed network resource allocations.

9. The non-transitory computer readable storage medium of claim 8, wherein the step of using the recorded observations to determine the function further comprises using learning algorithms to determine the function.

10. The non-transitory computer readable storage medium of claim 8, wherein the step of using the recorded observations to determine the function further comprises using a stochastic control algorithm to determine the function.

11. The non-transitory computer readable storage medium of claim 8, wherein the method further comprises updating the determined function and the calculated allocation of the network and processing resources continuously in real time.

12. The non-transitory computer readable storage medium of claim 8, wherein the plurality of computers communicate across a network.

13. The non-transitory computer readable storage medium of claim 8, wherein the method further comprises identifying at least one constraint on the allocation of network resources.

14. The non-transitory computer readable storage medium of claim 8, wherein the step of implementing the allocation of network and processing resources comprises using network filters or network resource reservation mechanisms to implement the allocation of network resources.

15. A method for processor and network resource management in a computing system, the method comprising:

identifying a performance objective for an application that utilizes network and processing resources and is running on a computer in a computing system containing a plurality of computers each running a plurality of applications, the identified performance objective dependent upon utilization of the network and processing resources by the application and comprising a prescribed performance target for execution of the application and utilization of the network and processing resources;

recording observations of utilization levels of the network and processing resources and associated realization levels for each performance objective over time during the execution of the applications, each observation comprising a sample point in a multi-dimensional space that comprises a separate dimension for each controllable processing resource and the utilization of that controllable processing resource, each allocatable network resource and the utilization of that allocatable network resource and realization levels of the performance objective such that the utilization of controllable processing resources central processing unit power, disk space and main memory contained in the given computer and utilized by the applications and allocatable network resources communication bandwidth, communication buffer space, link bandwidth, network switching bandwidth, network interface buffer capacity, operating system buffer capacity, application buffer capacity, network switching buffer capacity and queueing order within the computing system and utilized by the plurality of applications and the realization of the identified performance objective;

using the recorded observations to determine a multi-dimensional function expressing a dependency within the multi-dimensional space between realization of the identified performance objective and utilization of the network and processing resources by the applications;

using the determined multi-dimensional function to identify a desired set of actions with regard to allocation of the network and processing resources to the application that optimizes the identified performance objective, the desired set of actions comprising increasing and decreasing the allocation of the network and processing resources among the applications;

maintaining functions expressing utilization of processing resources by each application as a function of network resource allocation to that application;

using the maintained functions to analyze network resource allocations proposed by the identified desired set of actions for potential effects on processing resource allocations and performance objective;

scaling the proposed network resource allocations based upon the potential effects; and implementing the desired set of actions with regard to the allocation of the network and processing resources and the scaling of the proposed network resource allocations.

16. The method of claim 15, further comprising identifying a constraint comprising a minimum allocation of central processing unit processing power to any one of the plurality of applications running on the given computer at any time; and using the determined function and the constraint to calculate an allocation of the network and processing resources to the applications that optimizes the identified performance objective.

* * * * *